(12) United States Patent
Monzel

(10) Patent No.: US 6,884,532 B2
(45) Date of Patent: Apr. 26, 2005

(54) FUEL CELL SYSTEM AND METHOD FOR OPERATING THE FUEL CELL SYSTEM

(75) Inventor: Bernd Monzel, Denkendorf (DE)

(73) Assignee: Ballard Power Systems AG, Kirchheim-Nabern (DE)

( * ) Notice: Subject to any disclaimer, the term of this patent is extended or adjusted under 35 U.S.C. 154(b) by 392 days.

(21) Appl. No.: 10/159,293

(22) Filed: Jun. 3, 2002

(65) Prior Publication Data

US 2002/0187381 A1 Dec. 12, 2002

(30) Foreign Application Priority Data

Jun. 1, 2001 (DE) .......................................... 101 26 664

(51) Int. Cl.⁷ .......................... H01M 8/18; H01M 8/04; H01M 2/00; H01M 8/12; H01M 8/00
(52) U.S. Cl. .............................. 429/19; 429/19; 429/25; 429/34; 429/22; 429/13
(58) Field of Search .............................. 429/19, 35, 22, 429/14, 26, 13, 34, 17, 25, 23, 72, 101; 436/134, 3; 423/658, 657; 422/115, 213; 180/65.2; 73/49.2; 702/51; 220/560.15; 60/671

(56) References Cited

U.S. PATENT DOCUMENTS 6,277,329 B1 * 8/2001 Evans .......................... 422/80
6,519,041 B1 * 2/2003 Berthold ...................... 356/477

FOREIGN PATENT DOCUMENTS

DE 100 01 717 C1 1/2000
WO WO 99/57335 11/1999

* cited by examiner

Primary Examiner—Bruce F. Bell
Assistant Examiner—Robert Hodge
(74) Attorney, Agent, or Firm—Seed IP Law Group PLLC

(57) ABSTRACT

A fuel cell system having a fuel cell unit and a means for detecting hydrogen leaks in the fuel cell system. The fuel cell system comprises components which operate at an elevated temperature and are accommodated in a gas generation system box. The gas generation system box is connected to a suction line of a pump, which has a gas sensor arranged therein.

15 Claims, 2 Drawing Sheets

FUEL CELL SYSTEM AND METHOD FOR OPERATING THE FUEL CELL SYSTEM

BACKGROUND AND SUMMARY OF THE INVENTION

This application claims the priority of German patent document 101 26 664.2, filed Jun. 1, 2001, the disclosure of which is expressly incorporated by reference herein.

The invention relates to a fuel cell system having at least one fuel cell unit and means for detecting fuel leaks, and to a method for operating such a fuel cell system.

When fuel cell systems are operated, it is necessary to avoid accumulations of ignitable hydrogen in the system to the greatest extent possible. For example, German patent document DE 100 01 717, which is not prior art, discloses a fuel cell system in which Coanda flow boosters can be used at various locations in the fuel cell system in order to avoid dangerous build-ups of hydrogen or of fuel gases or fuel vapors.

International patent document WO 99/57335 A1, on the other hand, discloses an arrangement comprising fuel cells in which the use of explosion-protected components can be avoided. To protect electrical components from hydrogen leaks, an elevated pressure is provided at the corresponding area of the system, so that seepage of hydrogen is prevented.

One object of the invention is to provide a fuel cell system which is suitable specifically for mobile fuel cell installations.

This and other objects and advantages are achieved by the fuel cell system and method according to the invention, which has a housing in which components that operate at an elevated temperature are arranged. The housing may be thermally insulated, and its interior is evacuated via a suction line in which a hydrogen sensor may be arranged. The advantage of this arrangement is that the atmosphere in the interior of the housing reaches the hydrogen sensor in substantially undiluted form, so that even slight hydrogen leaks in the housing can be reliably detected before a critical concentration occurs.

The operational reliability of the fuel cell system is increased, and the build-up of undesirable quantities of hydrogen and/or build-ups of fuel gases or fuel vapors in the system can be effectively avoided.

Other objects, advantages and novel features of the present invention will become apparent from the following detailed description of the invention when considered in conjunction with the accompanying drawings.

DETAILED DESCRIPTION OF THE DRAWINGS

Figure 1:
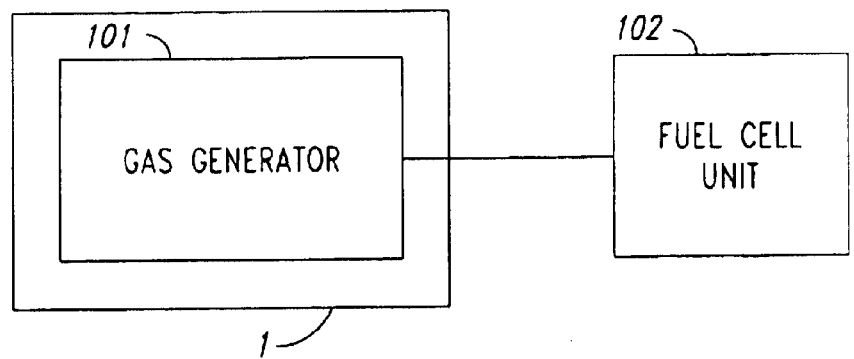
FIG. 1 is a conceptual block diagram of a fuel cell system that includes a gas generator.

FIG. 1 is a conceptual block diagram of a fuel cell system which includes a gas generator 101 that supplies gaseous fuel to a fuel cell 102. The gas generator 101, which may include, for example, a reformer, a reformate cleaner and a heat exchanger, is enclosed in a box or enclosure 1.

Figure 2:
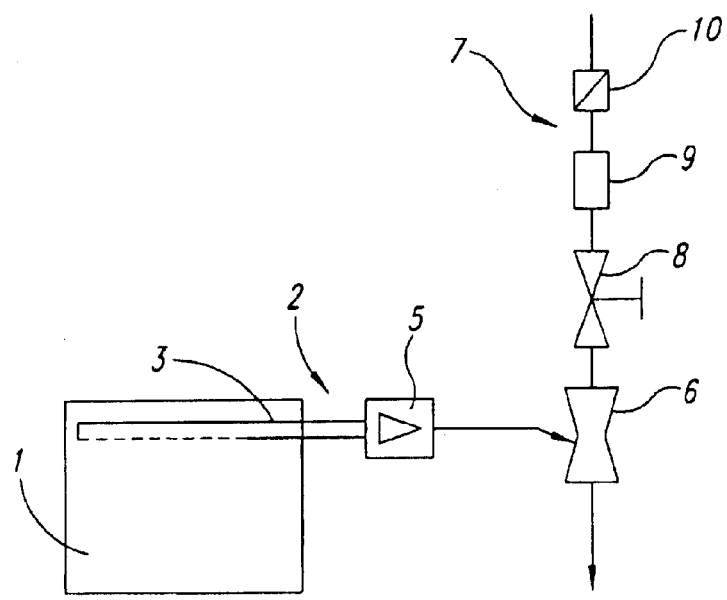
FIG. 2 depicts diagrammatically a detail of the fuel cell system of FIG. 1, which includes a gas generation system box that can be evacuated.

FIG. 2 illustrates a detail of the fuel cell system according to FIG. 1, that includes one or more fuel cell units or modules. The latter may be arranged in a surrounding fuel cell enclosure or box, which is closed off as far as possible. Further components of the system may also be accommodated in corresponding boxes.

According to the invention, and as shown in FIG. 2, the fuel cell system has a gas generation system box 1, the atmosphere of which can be evacuated through a suction line 2. Components 11 which operate at an elevated temperature (preferably above 80° C.) are accommodated in the gas generation system box 1, which is preferably thermally insulated. As noted above, the gas generation system includes standard components such as a reformer, a heat exchanger, and a reformate cleaner, which are standard in fuel cell systems with reforming.

The suction line 2 projects into the gas generation system box 1 by means of a suction mock-up 3 which can suck the atmosphere out of the gas generation system box 1 through suitable perforations. In the suction line there is a hydrogen sensor 5, which can detect hydrogen in the atmosphere that is sucked out of the gas generation system box 1 for that purpose. Purging of the interior of the gas generation system box 1, which would dilute the atmosphere with an additional purging medium, is substantially absent. The suction line 2 leads to a preferably passive vacuum pump 6 in the style of a water jet pump.

The vacuum in the suction line 2 is generated by the action of a high-pressure line 7 in which the pump 6 is arranged. A separate pump or a compressor which is present in the fuel cell system can be used to generate a high pressure in the high-pressure line 7.

Further components may be arranged in the high-pressure line 7 upstream of the pump 6, for example a needle valve 8 and/or a nonreturn valve 9 and/or a particle filter 10. The needle valve 8 can be used to set the pressure and/or the flow of medium in the high-pressure line 7. Undesired introduction of particles, liquid droplets and the like from the line system upstream of the valve 9 into the section of the high-pressure line 7 which lies upstream of the pump 6 and downstream of the nonreturn valve 9 can be prevented by the valve 9 as soon as the pressure in this section falls (for example when the installation is switched off). If there were no nonreturn valve 9, this could lead to the medium in the high-pressure line 7 of the pump 6 passing into the vacuum line of the pump 6, which is connected to the suction line 2. Particularly when the high-pressure side of a compressor on the side of the fuel cell system is being used to supply the high-pressure line 7, there is a risk that process air, which is necessarily humidified, will introduce moisture into the atmosphere of the gas generation system box 1. Such moisture could distort the measurement carried out by the hydrogen sensor 5.

There is then also a risk of fine abraded particles being sucked out of the upstream line system into the gas generation system box 1, which may also clog and block the needle valve 8. The particle filter 10 can be used to suppress the introduction of particles of this type.

In particular the combination of particle filter 10, nonreturn valve 9, needle valve 8, which are arranged in succession in the high-pressure line 7 as seen in the direction of flow of the high-pressure medium, upstream of the high-pressure pump 6, advantageously avoids such problems. Even very fine particles and humidity which are still able to pass the particle filter 10 are reliably retained by the nonreturn valve 9 when the fuel cell system or the high-pressure supply to the high-pressure line 7 of the pump 6 is switched off; therefore they do not pass into the gas generation system box 1 or the hydrogen sensor 5. The nonreturn valve preferably closes when the pressure in the high-pressure line falls below a predetermined threshold and opens when a predetermined pressure threshold is exceeded.

The high-pressure medium in the high-pressure line 7 may be air or inert gas, preferably fuel cell exhaust gas.

It has been found that a low excess pressure upstream of the passive high-pressure pump 6 of even about 100 mbar is sufficient to suck the atmosphere out of the gas generation system box 1. A volumetric flow of 6–7 l through the pump 6 is sufficient to reliably detect around 500 ml of leakage in the gas generation system box 1 within less than 2 seconds; this corresponds to detection of a leak rate of as little as approximately 250 ml/sec.

With the arrangement according to the invention, it is possible to detect even gradual leaks from the components in the gas generation system box 1. Even in the air stream, when the flow conditions mean that increased amounts of external air pass into the gas generation system box 1 through the unsealed parts of the housing, the arrangement according to the invention allows highly reliable detection of hydrogen leaks in the gas generation system box 1.

Figure 3:
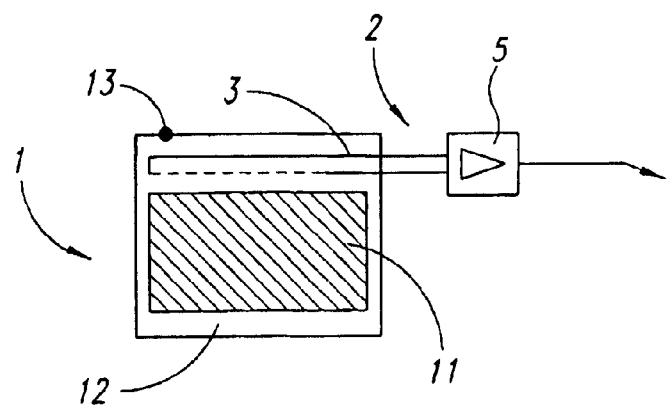
FIG. 3 shows a preferred configuration of a gas generation system box.

FIG. 3 shows a further detail of the arrangement. The gas generation system box 1 has a housing 13 which surrounds components of the system, which are denoted overall by 11. The arrangement of the components 11 is as compact as possible, in order to achieve a favorable temperature distribution within the components 11, and to ensure that there are few hollow spaces which could be filled with hydrogen. The suction mock-up 3 projects into the empty space between the housing 13 and the compact arrangement of components 11, preferably in the upper region of the housing 13, where rising hydrogen could accumulate.

Figure 4:
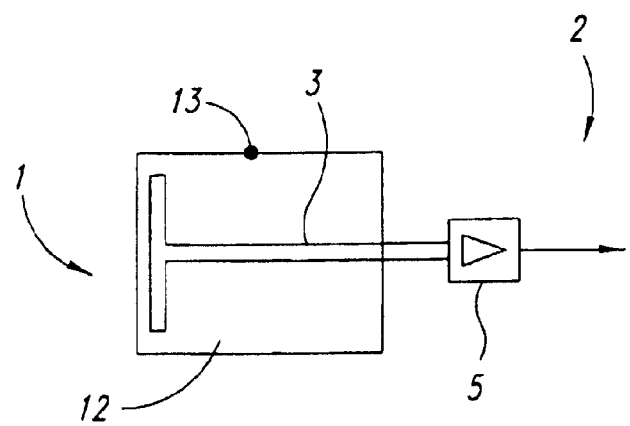
FIG. 4 shows a plan view of a preferred arrangement of the suction line in a gas generation system box with hydrogen sensors.

FIG. 4 shows a plan view of a further detail of the arrangement. The suction mock-up may branch in the gas generation system box 1 and may be of approximately T-shaped design; it is also possible for a plurality of branches of the suction mock-up 3, which extend perpendicular to the principal axis of the suction mock-up 3, to be provided. The suction mock-up is preferably formed from pipes which have holes through which the atmosphere is sucked out of the gas generation system box 1 into the interior of the suction mock-up 3.

In the process, it is possible to establish a slight partial vacuum in the gas generation system box 1. However, this is not imperative, since it is even advantageously possible to utilize a slight failure of the housing 13 of the gas generation system box 1 to be completely sealed. The pressure in the gas generation system box 1 then remains at approximately ambient pressure, since the external air surrounding the housing 13 is sucked through these unsealed parts of the housing, so that it can convey any hydrogen leaks which are present to the hydrogen sensor 5 without significant dilution.

It is expedient for the thermal decoupling in the suction line 2 to be provided in such a way that the pump 6 is thermally separated from the gas generation system box 1. This may be arranged upstream or downstream of the hydrogen sensor 5.

The waste air from the pump 6 is preferably fed to the environment. In the case of a fuel cell system used in a vehicle, the waste air can be fed to the vehicle exhaust-gas stream.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system having a fuel cell unit, an apparatus for detecting hydrogen leaks, and components for generating gaseous fuel for the fuel cell unit, said fuel cell system comprising:

a gas generation system box, in which the components for generating gaseous fuel that operate at an elevated temperature are accommodated; and a suction line connected to the gas generation system box.

2. The fuel cell system according to claim 1, wherein the suction line is connected to a pump.

3. The fuel cell system according to claim 2, wherein the pump is a passive vacuum pump in the form of a water jet pump.

4. The fuel cell system according to claim 2, wherein the pump is arranged in a high-pressure line.

5. The fuel cell system according to claim 4, wherein at least one of a needle valve and a particle filter is arranged in the high-pressure line.

6. The fuel cell system according to claim 4, wherein a nonreturn valve is arranged in the high-pressure line.

7. The fuel cell system according to claim 4, wherein a particle filter, a nonreturn valve and a needle valve are arranged sequentially in the high-pressure line, upstream of the pump relative to a direction of flow of a high-pressure medium.

8. The fuel cell system according to claim 4, wherein the high-pressure line is connected to one of a high-pressure side of a compressor which supplies air to the fuel cell unit, and a fuel cell exhaust-gas line.

9. The fuel cell system according to claim 1, further comprising a hydrogen sensor arranged in the suction line.

10. The fuel cell system according to claim 1, wherein the suction line projects into the gas generation system box by means of a suction mock-up.

11. The fuel cell system according to claim 10, wherein the suction mock-up comprises a pipe with holes therein.

12. A fuel cell system, comprising:

a fuel cell unit;

a gas generator connected to supply fuel gas to said fuel cell unit;

an enclosure surrounding components of said gas generator; and a suction line connected in fluid flow communication with an interior of said enclosure.

13. The fuel cell system according to claim 12, further comprising a gas sensor disposed in said suction line, for detecting gas leaks in said components within the enclosure.

14. An apparatus for detecting gas leaks in a fuel cell system having a gas generator for supplying fuel gas to a fuel cell unit, said apparatus comprising:

an enclosure which houses components of said gas generator;

a suction line coupled to evacuate an interior of said enclosure; and a gas sensor disposed in said suction line.

15. A method for detecting gas leaks in a fuel cell system that includes a gas generator coupled to supply fuel gas to a fuel unit, said method comprising:

providing a housing which encloses components of said gas generator;

evacuating an atmosphere within an interior of said housing via a suction line; and detecting gas contained in a gas flow in said suction line.

* * * * *